US009357502B2

(12) United States Patent
Lim et al.

(10) Patent No.: US 9,357,502 B2
(45) Date of Patent: May 31, 2016

(54) METHOD AND APPARATUS FOR CONTROLLING THE TRANSMISSION POWER OF A BASE STATION IN A WIRELESS COMMUNICATION SYSTEM

(75) Inventors: Chae Gwon Lim, Seoul (KR); Young Joo Suh, Pohang-si (KR); Sung Ho Choi, Suwon-si (KR); Beom Sik Bae, Suwon-si (KR); Song Yean Cho, Seoul (KR); Dong Wook Kim, Pohang-si (KR); Jeong Yoon Lee, Pohang-si (KR); Wan Seon Lim, Pohang-si (KR); Kyoung Hak Jung, Pohang-si (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 84 days.

(21) Appl. No.: 13/885,798

(22) PCT Filed: Nov. 24, 2011

(86) PCT No.: PCT/KR2011/009005
§ 371 (c)(1),
(2), (4) Date: May 16, 2013

(87) PCT Pub. No.: WO2012/070877
PCT Pub. Date: May 31, 2012

(65) Prior Publication Data
US 2013/0242791 A1   Sep. 19, 2013

(30) Foreign Application Priority Data

Nov. 24, 2010   (KR) ........................ 10-2010-0117276

(51) Int. Cl.
*H04L 1/00*   (2006.01)
*H04W 52/24*   (2009.01)
(Continued)

(52) U.S. Cl.
CPC ............ *H04W 52/24* (2013.01); *H04W 52/143* (2013.01); *H04W 52/241* (2013.01);
(Continued)

(58) Field of Classification Search
CPC ... H04W 52/24; H04W 52/40; H04W 52/143; H04W 52/223; H04W 52/241; H04W 52/242; H04W 52/243; H04W 52/245; Y02B 60/50
USPC ........................ 370/252, 328; 455/422.1, 522
See application file for complete search history.

(56) References Cited

U.S. PATENT DOCUMENTS

| 8,412,256 B2 * | 4/2013 | Lee et al. ....................... 455/522 |
| 2006/0019694 A1 * | 1/2006 | Sutivong ............... H04W 52/24 455/522 |

(Continued)

FOREIGN PATENT DOCUMENTS

| KR | 10-2001-0024049 A | 3/2001 |
| KR | 10-2009-0034552 A | 4/2009 |

(Continued)

OTHER PUBLICATIONS

Kyocera: "Network Assisted Home eNodeB Transmission Power Control in Downlink", 3GPP Draft; R4-093619, 3rd Generation Partnership Project (3GPP), Mobile Competence Centre; 650, Route Des Lucioles; F-06921 Sophia-Antipolis Cedex; France, No. Miyazaki; 20091012, Oct. 12, 2009 XP050393231.

*Primary Examiner* — Clemence Han
(74) *Attorney, Agent, or Firm* — Jefferson IP Law, LLP

(57) ABSTRACT

The present invention relates to a method and apparatus for controlling transmission power of the base station in a wireless communication system and includes calculating signal-to-noise ratio of a target component carrier and recovering the signal-to-noise ratio to be equal to or greater than a threshold by increasing a transmission power to a predetermined level and requesting, when the signal-to-noise ratio is less than a predetermined threshold, a neighbor base station to decrease the transmission power. According to the present invention, it is possible to suppress the inter-cell interference and improve channel utilization efficiency, resulting in improvement of the throughput of the wireless communication system.

16 Claims, 7 Drawing Sheets

(51) Int. Cl.
   *H04W 52/40* (2009.01)
   *H04W 52/14* (2009.01)
   *H04B 7/00* (2006.01)
   *H04W 52/22* (2009.01)

(52) U.S. Cl.
   CPC ............ *H04W52/243* (2013.01); *H04W 52/40* (2013.01); *H04W 52/223* (2013.01); *H04W 52/242* (2013.01); *H04W 52/245* (2013.01); *Y02B 60/50* (2013.01)

(56) References Cited

U.S. PATENT DOCUMENTS

| | | | | |
|---|---|---|---|---|
| 2006/0092872 | A1* | 5/2006 | Lee et al. | 370/328 |
| 2006/0093026 | A1* | 5/2006 | Montojo | H04W 52/267 375/225 |
| 2006/0234752 | A1* | 10/2006 | Mese et al. | 455/522 |
| 2007/0064665 | A1* | 3/2007 | Zhang et al. | 370/343 |
| 2008/0039129 | A1* | 2/2008 | Li | H04L 1/0003 455/522 |
| 2008/0214121 | A1* | 9/2008 | Sutivong | H04L 1/0045 455/67.13 |
| 2009/0180413 | A1* | 7/2009 | Sutton | H04W 52/0225 370/311 |
| 2009/0203310 | A1* | 8/2009 | Lozano | H04B 7/155 455/15 |
| 2010/0009710 | A1* | 1/2010 | Zhang et al. | 455/522 |
| 2010/0098051 | A1* | 4/2010 | Uemura | H04W 56/0015 370/350 |
| 2010/0144381 | A1 | 6/2010 | Park et al. | |
| 2011/0098054 | A1* | 4/2011 | Gorokhov et al. | 455/452.1 |
| 2011/0143806 | A1* | 6/2011 | Song et al. | 455/522 |
| 2011/0275404 | A1* | 11/2011 | Ding | H04W 52/241 455/522 |
| 2011/0286502 | A1* | 11/2011 | Adachi | H04L 25/0242 375/219 |
| 2011/0319126 | A1* | 12/2011 | Chang et al. | 455/522 |
| 2012/0122513 | A1* | 5/2012 | Yang et al. | 455/522 |

FOREIGN PATENT DOCUMENTS

| | | |
|---|---|---|
| KR | 10-2010-0005575 A | 1/2010 |
| KR | 10-2010-0065075 A | 6/2010 |

* cited by examiner

METHOD AND APPARATUS FOR CONTROLLING THE TRANSMISSION POWER OF A BASE STATION IN A WIRELESS COMMUNICATION SYSTEM

BACKGROUND OF THE INVENTION

1. Field of the Invention

The present invention relates to an operation method and apparatus of a base station in a wireless communication system and, in particular, to a method and apparatus for controlling transmission power of the base station in a wireless communication system.

2. Description of the Related Art

Typically, a wireless communication system provides communication services with various service qualities at high data rage. An Orthogonal Frequency Division Multiplexing (OFDM) based wireless communication system is such a wireless communication system. OFDM is a multicarrier method for transmitting data on multiple subcarriers arranged at even intervals to guarantee orthogonally and advantageous in frequency utilization efficiency and robustness to multipath fading.

DISCLOSURE OF INVENTION

Technical Problem

However, such a wireless communication system has a problem of Inter Cell Interference (ICI) caused when the adjacent base stations transmit signals on the same subcarrier. That is, the signals transmitted on the same subcarrier cause interferences to the adjacent base stations. The inter-cell interference degrades the channel utilization efficiency in the wireless communication system. As a consequence, the throughput of the wireless communication system is degraded.

The present invention aims to improve the throughput of the wireless communication system. In order to accomplish this, the present invention provides an Inter Cell Interference Coordination (ICIC) method for use in the wireless communication system.

Solution to Problem

In order to solve the above problem, a transmission power control method of a base station in a wireless communication system according to the present invention includes calculating signal-to-noise ratio of a target component carrier and recovering the signal-to-noise ratio to be equal to or greater than a threshold by increasing a transmission power to a predetermined level and requesting, when the signal-to-noise ratio is less than a predetermined threshold, a neighbor base station to decrease the transmission power.

Preferably, in the transmission power control method of a base station according to the present invention, recovering includes increasing the transmission power when a neighbor signal-to-noise ratio calculated at the neighbor base station in correspondence to the component carrier is equal to or greater than a predetermined neighbor threshold and requesting, when the neighbor signal-to-noise ratio is greater than the neighbor threshold, the neighbor base station to reduce the neighbor transmission power.

Preferably, the transmission power control method of a base station according to the present invention increases the transmission power, when the signal-to-noise ratio is greater than the threshold.

In order to solve the above problem, a transmission power control apparatus of a base station in a wireless communication system includes a signal-to-noise ratio calculator which calculates a signal-to-noise ratio of a target component carrier; and a power regulator which recovers the signal-to-noise ratio to be equal to or greater than a threshold by increasing a transmission power to a predetermined level and requesting, when the signal-to-noise ratio is less than a predetermined threshold, a neighbor base station to decrease the transmission power.

Preferably, in the transmission power control apparatus of the present invention, the power regulator increases the transmission power when a neighbor signal-to-noise ratio calculated at the neighbor base station in correspondence to the component carrier is equal to or greater than a predetermined neighbor threshold. Preferably, the power regulator requests, when the neighbor signal-to-noise ratio is greater than the neighbor threshold, the neighbor base station to reduce the neighbor transmission power.

Preferably, in the transmission power control apparatus according to the present invention, the power regulator increases the transmission power, when the signal-to-noise ratio is greater than the threshold.

Advantageous Effects

A transmission power control method and apparatus of the present invention is capable of controlling the transmission power of a serving eNB or a neighbor eNB on a target component carrier in a wireless communication system. Through this, the SNR of a cell is maintained in a predetermined range so as to suppress inter-cell interference and improve channel utilization efficiency of the wireless communication system. This results in improvement of the throughput of the wireless communication system.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
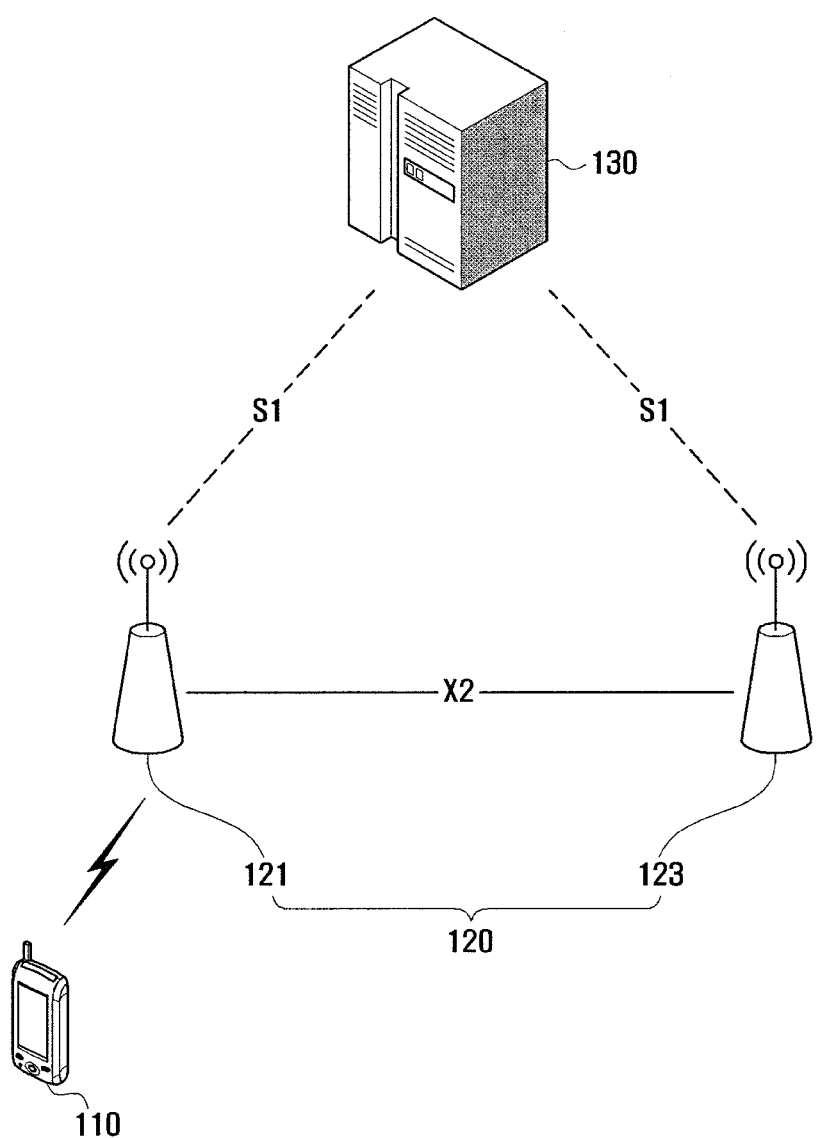
FIG. 1 is a schematic diagram illustrating a wireless communication system according to an embodiment of the present invention.

FIG. 1 is a schematic diagram illustrating a wireless communication system according to an embodiment of the present invention. Although the embodiment is directed to a Long Term Evolution (LTE) system as the wireless communication system, the present invention is not limited thereto.

Referring to FIG. 1, the wireless communication system according to this embodiment includes a User Equipment (UE) 110, an evolved Node B (eNB) 120, and a Core Network node 130. At this time, Carrier Aggregation (CA) technology for aggregating plural carriers is implemented in the wireless communication system according to an embodiment of the present invention. In the case of applying CA technology, each carrier is provided as Component Carriers (CC).

The UE 110 uses a communication service through wireless communication. At this time, the UE is capable of using a communication service on plural component carriers. Here, the communication service may be a voice services or a data service. Also, the UE 110 may be fixed or mobile.

The eNB 120 manages a cell and supports wireless communication of the UE 110 within the cell. Here, the cell may be the cell of a normal cellular system. The terms 'eNB' and 'cell' can be used interchangeably in the same meaning. The eNB 120 establishes a radio channel with the UE 110 and controls radio resource. For example, the eNB 120 is capable of generating system information to broadcast intra cell information and allocating radio resource for communicating packet data or control information with the UE 110. Here, the system information may include operator information (PLMN ID; PLMN Indicator) of the wireless network Public Land Mobile Network (PLMN) accessible via the eNB 120, eNB Cell Global ID (ECGI), and Tracking Area ID (TAI) of each cell. For this purpose, the eNB 120 is provided with a control protocol such as Radio Resource Control (RRC) protocol related to radio resource management.

At this time, the eNB 120 provides the UE 110 with communication service through multiple component carriers. That is, the eNB 120 provides the communication service with at least one of the component carriers allocated for the corresponding eNB 120. For example, if among at least three component carriers the first and third component carriers are assigned to the eNB 120, the eNB provides the communication service using the first and third component carriers.

For a specific UE 110, the eNB 120 can be a serving eNB 121 or a neighbor eNB 123. The serving eNB 121 manages the serving cell in which the UE 110 connects to the eNB 121 substantially. The serving eNB 121 provides the communication service to the UE 110 within the serving cell. The neighbor eNB 123 manages a neighbor cell and is adjacent to the serving eNB 121. Here, the serving eNB 121 and the neighbor eNB 123 are connected to each other through X2 interface. The eNB 120 is capable of receiving channel state information of the serving and neighbor cells. With the channel state information, the eNB 120 controls the transmission power on the target component carrier. In addition, the eNB 120 is capable of making a handover decision for the UE 110 and commanding handover.

The core network node 130 manages the UE 110 and the eNB 120 and supports radio communication between the UE 110 and the eNB 120. Here, the core network node 130 connects to the eNB 120 through S1 interface. At this time, the core network node 130 includes at least one of Mobility Management Entity (MME), Serving Gateway (S-GW), Packet Data Network Gateway (P-GW), and Home Subscriber Server (HSS).

The MME manages the UE 110 in idle mode and selects S-GW and P-GW for the UE 110. The MME is responsible of the function related to the roaming and authentication of the UE 110. The MME also processes the bearer signal generated by the UE 110. For this purpose, the MME allocates identity information to the UE 110 and controls the connection of the UE 110 and manages the UE 110 based on the identity information. At this time, the MME communicates with the UE 110 using Non Access Stratum (NAS) messages.

The MME connects to the UE 110 via the eNB 120. The MME also supports plural tracking areas and connects to plural eNBs 120 supporting respective tracking area informations. That is, the plural eNBs 120 supporting the same tracking area information can be connected to the same MME. The eNBs 120 supporting different tracking area informations can connect to the respective MMEs. Also, the eNB 120 supporting different tracking area informations may connect to the same MME 130.

The S-GW connects to the eNB 120 and MME. The S-GW is responsible for controlling mobility of the UE 110. That is, the S-GW works as mobility anchor for the movement of the UE 110.

The P-GW connects to the S-GW. The P-GW also connects to an Internet Protocol (IP) network. The P-GW is responsible for allocating IP address to the UE 110 and processing packet data. That is, the P-GW delivers the packet data from the IP network to the UE 110 and from the UE 110 to the IP network. The P-GW determines the bearer bandwidth for the UE 110 and performs packet data forwarding and routing function. In addition, the P-GW is capable of working as a mobility anchor for the movement of the UE 110.

The HSS stores the subscription information of the UE 110. The HSS is capable of providing the MME with the subscription information of the UE 110 for use in control of the UE 110.

Assuming the above-structured wireless communication system, a description is made of configuration and operations of the eNB 120 according to an embodiment of the present invention in detail hereinafter. In the wireless communication system, the eNB operates as the serving eNB 121 of the UE 110 for the corresponding cell and as a neighbor eNB 123 for the neighbor cell. In the following, the description is directed to the configuration and operations of the serving eNB 121 of the UE 110, and this is applied to the eNB 120 of the wireless communication systems identically.

Figure 2:
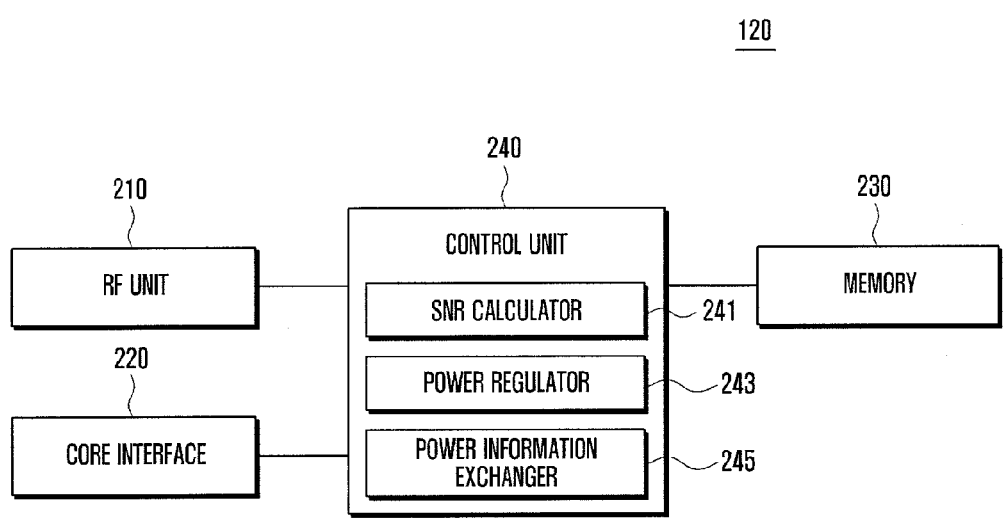
FIG. 2 is a block diagram illustrating the configuration of the eNB according to an embodiment of the present invention.

FIG. 2 is a block diagram illustrating the configuration of the eNB according to an embodiment of the present invention. Although the description is made under the assumption that the eNB is a macro eNB in this embodiment, the present invention is not limited thereto.

Referring to FIG. 2, the eNB 120 according to this embodiment includes a Radio Frequency (RF) unit 210, a core interface unit 220, a memory unit 230, and a control unit 240.

The RF unit 210 is responsible for radio communication function of the eNB 120. The RF unit 210 is capable of including a radio interface for communicating signals with the UE 110 and X2 interface for communicating signals with another eNB 120.

The core interface unit 220 is responsible for communication of the eNB 120 with the core network node 130. The core network interface 220 is capable of including a S1 interface for communicating signals with the core network node 130. Here, the core network interface unit 220 is capable of communicating signals with the core network node 130 through wired link.

The memory 230 is provided with program and data memories. The program memory stores programs for controlling general operations of the eNB 120. At this time, the program memory stores the programs for managing the transmission power according to an embodiment of the present invention. The data memory stores the data generated by the execution of the programs.

The control unit 240 controls overall operations of the eNB 120. At this time, the control unit 240 controls the transmission power according to an embodiment of the present invention. That is, the control unit 240 is capable of increasing the transmission power on a specific component carrier to a predetermined level. The control unit 240 is also capable of requesting the neighbor eNB 123 to reduce transmission power on the corresponding component carrier. The control unit 240 is also capable of reducing the transmission power on the corresponding component carrier to a predetermined level in response to the request from the neighbor eNB 123. The control unit 240 is provided with a Signal to Noise Ratio (SNR) calculator 241, a power regulator 243, and a power information exchanger 245.

The SNR calculator 241 calculates SNR on a specific component carrier. At this time, the SNR calculator 241 collects the channel state information on the current component carrier from the UE 110 to calculate the SNR of the current component carrier. The SNR calculator 241 also calculates the SNR of a target component carrier. At this time, the SNR calculator 241 is capable of calculating the SNR of the target component carrier based on the SNR of the current component carrier.

The power regulator 243 compares the SNR of the target component carrier with a predetermined SNR threshold. If the SNR of the target component carrier is less than the SNR threshold, the power regulator 243 adjust the transmission power to a predetermined level to recover the SNR of the target component carrier to be equal to or greater than the SNR threshold. At this time, the power regulator 243 is capable of increasing the transmission power to a predetermined level.

The power regulator 243 is also capable of requesting the neighbor eNB 123 to reduce the transmission power. If the SNR of the target component carrier is equal to or greater than the SNR threshold, the power regulator 243 increases the transmission power of the target component carrier to a predetermined level. The power regulator 243 decreases the transmission power of a specific component carrier to a predetermined level in response to a request of from the neighbor eNB 123.

The power information exchanger 245 exchanges power information including SNR and transmission power of the current component carrier with the neighbor eNB 123. At this time, the power information exchanger 245 is capable of exchanging the power information with the neighbor eNB 123 at a predetermined period. The power information exchanger 245 also controls to store the power information of the neighbor eNB 123.

Figure 3:
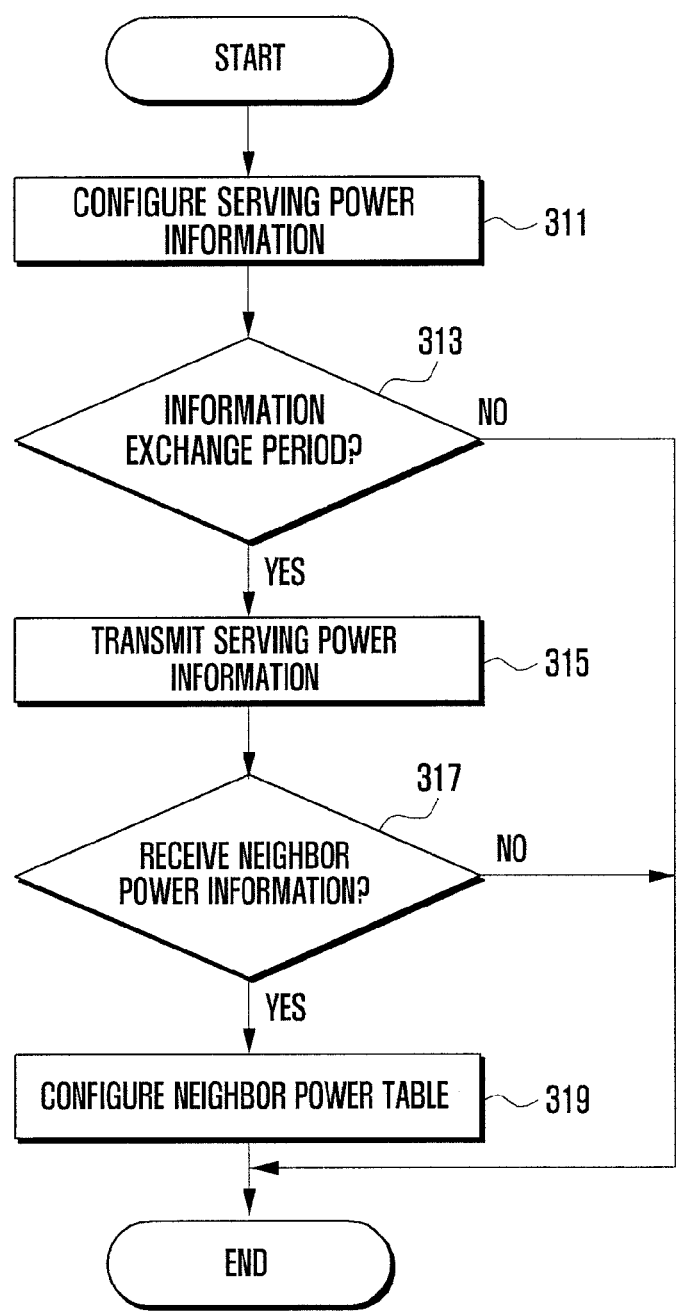
FIG. 3 is a flowchart illustrating the power information sharing procedure of the eNB according to an embodiment of the present invention.

FIG. 3 is a flowchart illustrating the power information sharing procedure of the eNB according to an embodiment of the present invention.

In the embodiment of FIG. 3, the power information sharing procedure of the eNB 120 starts in such a way that the control unit 240 configures the serving power information at step 311. At this time, the control unit 240 collects the channel state information of the current component carrier to calculate SNR of the current component carrier, i.e. serving SNR. Here, the control unit 240 calculates the serving SNR as the signal-power-to-interference ratio measured at the UE 110 within the cell on the current component carrier. The control unit 240 also determines the serving transmission power configured in correspondence to the current component carrier.

The control unit 240 also configures the serving power information with the serving SNR and serving transmission power.

If a predetermined information exchange period arrives, the control unit 240 detects this at step 313 and transmits the serving power information to the neighbor 123 at step 315. At this time, the control unit 240 is capable of transmitting the serving power information through X2 interface. Here, the memory 230 stores the eNB ID of the neighbor eNB 123, and the control unit 240 transmits the serving power information to another eNB 120 using the eNB ID stored in the memory 230.

If the neighbor power information is received from the neighbor eNB 123, the control unit 240 detects this at step 317 and configures a neighbor power table with the neighbor power information at step 319. At this time, the control unit 240 is capable of receiving the neighbor power information through X2 interface. The neighbor power information includes eNB ID and eNB type of the neighbor eNB 123, SNR of the current component carrier, i.e. neighbor SNR, and transmission power configured in correspondence to the current component carrier, i.e. neighbor transmission power. The memory 230 also stores the neighbor power table as shown in table 1. That is, the control unit 240 stores the current SNR corresponding to the eNB ID of the neighbor power information as previous SNR and the neighbor SNR and neighbor transmission power as current SNR and current transmission power to update the neighbor power table in the memory 230.

TABLE 1

| ENB ID | ENB type | Current Tx power (dBm) | Current SNR (dB) | Previous SNR (dB) | Threshold (dB) |
|--------|----------|------------------------|------------------|-------------------|----------------|
| 0000   | A        | CP0                    | CS0              | PS0               | ST0            |
| 0001   | B        | CP1                    | CS1              | PS1               | ST1            |
| 0002   | A        | CP2                    | CS2              | PS2               | ST2            |
| —      | —        | —                      | —                | —                 | —              |
| —      | —        | —                      | —                | —                 | —              |

Figure 4:
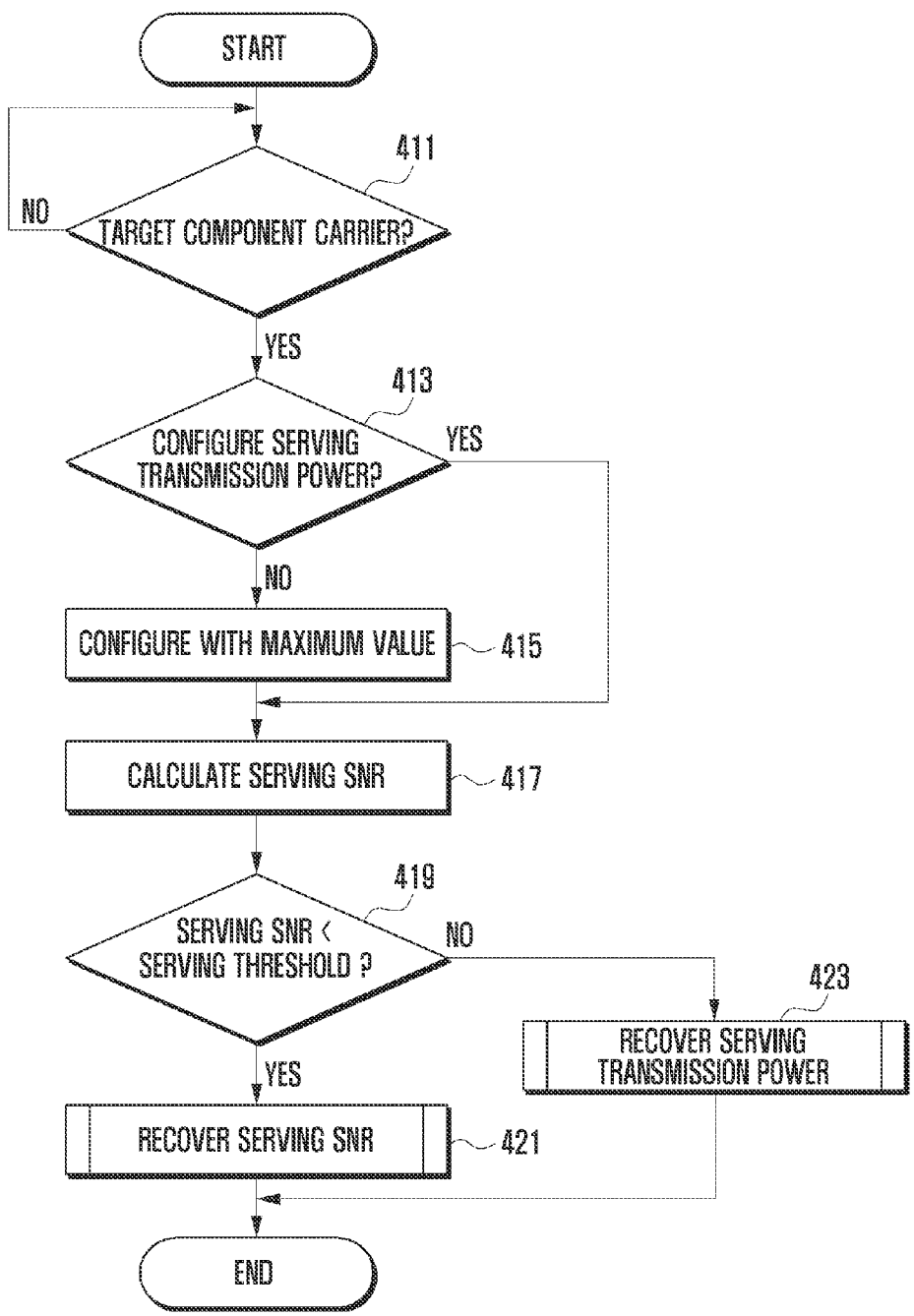
FIG. 4 is a flowchart illustrating the transmission power control procedure of the eNB according to an embodiment of the present invention.

FIG. 4 is a flowchart illustrating the transmission power control procedure of the eNB according to an embodiment of the present invention.

In the embodiment of FIG. 4, the power control procedure eNB 120 starts in such a way that the control unit 240 determines the target component carrier at step 441. That is, if the component carrier assigned to the eNB 120 for providing the communication service to the UEs within the cell is checked, the control unit 240 determines that the corresponding component carrier as the target component carrier. If the target component carrier is determined at step 441, the control unit 240 determines whether there is a pre-configured serving transmission power in the serving power information at step 413. If it is determined that there is no preconfigured serving transmission power, the control unit 240 sets the serving transmission power to the maximum value among available values at step 415.

Next, the control unit 240 calculates the serving SNR of the target component carrier at step 417. At this time, the control unit 240 is capable of calculating the serving SNR of the target component carrier based on the serving power information. Next, the control unit compares the serving SNR with a predetermined SNR threshold at step 419. At this time, the control unit 240 determines whether the serving SNR is less than the threshold, i.e. serving threshold.

Finally, if it is determined that the serving SNR is less than the serving threshold, the control unit 240 performs the procedure for recovering the serving SNR to be equal to or greater than the serving threshold in correspondence to the target component carrier at step 421 and ends the serving transmission power control procedure. That is, the control unit 240 adjusts the serving transmission power of the target component carrier to a predetermined value. For this purpose, the control unit 240 is also capable of increasing the serving transmission power to a predetermined level. A description is made of the serving SNR recovery procedure of the eNB hereinafter in detail.

Figure 5:
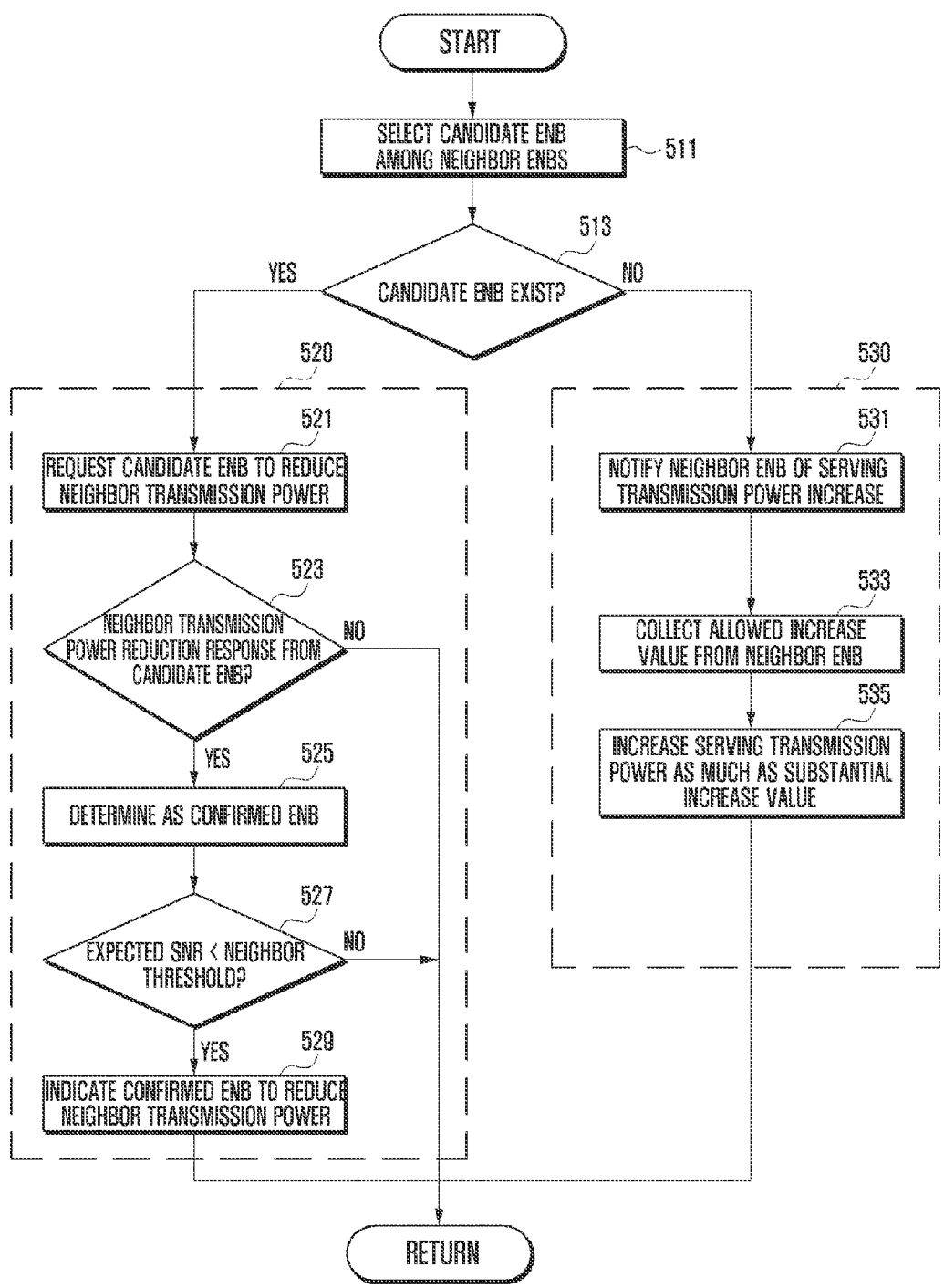
FIG. 5 is a flowchart illustrating the SNR recovery procedure of FIG. 4.

FIG. 5 is a flowchart illustrating the SNR recovery procedure of FIG. 4.

In the embodiment of FIG. 5, the SNR recovery procedure of the eNB 120 starts in such a way that the control unit 240 determines a candidate eNB among the neighbor eNBs 123 at step 511. At this time, the control unit 240 checks the neighbor eNBs 123 in the neighbor power table. That control unit 240 determines whether it is possible for the neighbor eNB 123 to reduce the neighbor transmission power. If it is possible for the neighbor eNB 123 to reduce the neighbor transmission power, the control unit 240 determines that the neighbor eNB 123 as a candidate eNB. Otherwise if it is impossible for the neighbor eNB 123 to reduce the neighbor transmission power, the control unit 240 rules out the neighbor eNB 123.

For example, the control unit 240 is capable of calculating a neighbor SNR margin corresponding to the neighbor eNB 123 as shown in equation (1). That is, the control unit checks the neighbor SNR of the neighbor eNB 123 and the predetermined threshold in correspondence to the neighbor eNB 123, i.e. neighbor threshold, in the neighbor power table to calculate the neighbor SNR margin. The control unit is also capable of determining whether the neighbor SNR corresponding to the neighbor eNB 123 is greater than the neighbor threshold and whether the neighbor eNB margin is greater than 0. At this time, if it is determined that the neighbor SNR margin is greater than 0 in correspondence to the neighbor eNB 123, the control unit 240 determines that it is possible for the neighbor eNB 123 to reduce the neighbor transmission power.

$$SNR\_Margin = Current\_SNR - SNR\_Threshold \quad \text{Equation (1)}$$

Here, SNR_Margin denotes the margin of the neighbor SNR of the neighbor eNB, Current_SNR denotes the neighbor SNR of the neighbor eNB 123, and SNR_Threshold denotes the neighbor threshold of the neighbor eNB 123.

At this time, if there are plural neighbor eNBs 123 in the neighbor power table, the control unit 240 selects at least one of the neighbor eNBs 123 as the candidate eNB to configure a candidate eNB set. Here, if 5 candidate eNBs are determined, the control unit 240 arranges the candidate eNBs in a descending order of margin to configure the candidate eNB set.

Next, the control unit 240 determines whether any candidate eNB exists at step 513. That is, the control unit 240 determines whether at least one candidate eNB exists in the candidate eNB set. If it is determined that any candidate eNB exists at step 513, the control unit 240 requests the candidate eNB to reduce the neighbor transmission power at step 520. Here, the control unit 240 checks whether the candidate eNB is allowed to reduce the neighbor transmission power substantially to determine whether to instruct the neighbor eNB to perform neighbor transmission power reduction. The control unit 240 is also capable of determining whether it is available to reduce the neighbor transmission power of the candidate eNB in the order of arrangement within the candidate eNB set. Otherwise, if it is determined that no candidate eNB exists at step 513, the control unit 240 increases the serving transmission power to a predetermined level at step 530. Here, the control unit 240 determines whether the increase of the serving transmission power does not influence the neighbor SNR of the neighbor eNB 123 to determine whether to increase the serving transmission power.

That is, if it is determined that any candidate eNB exists, the control unit requests the candidate eNB for neighbor transmission power reduction at step 521. At this time, the control unit 240 checks the neighbor eNBs in the neighbor eNB set. The control unit 240 is also capable of sending the candidate eNB a power reduction value to be applied to the neighbor transmission power reduction of the candidate eNB. That is, the control unit 240 is capable of request the candidate eNB to decreases the neighbor transmission power as much as the power reduction value from a preconfigured value. For example, the control unit 240 is capable of calculating the power reduction value as shown in equation (2). That is, the control unit 240 is capable of checking the neighbor SNR of the neighbor eNB 123 corresponding to the candidate eNB, neighbor threshold, and neighbor transmission power in the neighbor power table to calculate the power reduction value for the candidate eNB.

$$Reducible\_TX\_Power = (SNR\_Threshold)/(Current\_SNR) * Current\_TX\_Power \quad \text{Equation (2)}$$

Here, Reducible_TX_Power denotes the power reduction value for the candidate eNB, SNR_Threshold denotes the neighbor threshold of the neighbor eNB 123 as a candidate eNB, Current_SNR denotes the neighbor SNR of the neighbor eNB 123 as a candidate eNB, and Current_TX_Power denotes the neighbor transmission power of the neighbor eNB 123 as a candidate eNB.

Sequentially, if a response is received from the candidate eNB in response to the neighbor power reduction request, the control unit 240 detects this at step 523 and determines the candidate eNB as a confirmed eNB at step 525. At this time, the control unit 240 may receive the expected SNR from the confirmed eNB as a consequence of the neighbor transmission power reduction as much as the power reduction value. The expected SNR calculation procedure of the confirmed eNB is described later with reference to FIG. 7.

Finally, the control unit 240 checks the neighbor threshold value of the neighbor eNB 123 as the confirmed eNB at step 527 and compares the expected SNR of the confirmed eNB with the neighbor threshold at step 527. If it is determined that the expected SNR of the confirmed eNB is greater than the neighbor threshold, the control unit 240 instructs the confirmed eNB to reduce the neighbor transmission power as much as the power reduction value at step 529 and returns the procedure to FIG. 4.

If it is determined that no candidate eNB exists at step 513, the control unit 240 notifies the neighbor eNB 123 of the increase of the serving transmission power at step 531. At this time, the control unit 240 checks the neighbor eNB 123 in the neighbor power table. The control unit 240 is also capable of transmitting to the neighbor eNB 123 a neighbor transmission power hold value to be maintained at the neighbor eNB 123. That is, the control unit 240 determines that the neighbor eNB 123 has to maintain the neighbor transmission power equal to or greater than the neighbor transmission power hold value, and sends the neighbor transmission power hold value to the neighbor eNB 123. For example, the control unit 240 is capable of calculating the power hold value as shown in equation (3). That is, the control unit 240 is capable of calculating the power hold value for the neighbor eNB 123 based on the neighbor SNR, neighbor threshold, and neighbor transmission power of the neighbor eNB 123 checked in the neighbor power table.

$$Required\_TX\_Power=(SNR\_Threshold)/(Current\_SNR)*Current\_TX\_Power \quad \text{Equation (3)}$$

Here, Required_TX_Power denotes the power reduction value for the candidate eNB, SNR_Threshold denotes the neighbor threshold of the neighbor eNB 123 as a candidate eNB, Current_SNR denotes the neighbor SNR of the neighbor eNB 123 as a candidate eNB, and Current_TX_Power denotes the neighbor transmission power of the neighbor eNB 123 as a candidate eNB.

Finally, the control unit 240 collects allowable increase value allowed at the neighbor eNB 123 for increase of the serving transmission power at step 533. The allowable increase value calculation procedure of the neighbor eNB 123 is described later with reference to FIG. 7. After increasing the serving transmission power as much as the allowable increase value at step 619, the control unit 240 returns the procedure to FIG. 4. At this time, the control unit 240 determines the substantial increase value based on the allowable increase value of the neighbor eNB 123. Here, the control unit 240 is also capable of determining the substantial increase value corresponding to the minimum value for allowable increase values. The control unit 240 increases the serving transmission power as much as the substantial increase value from the preconfigured value.

If it is determined that the serving SNR is equal to or greater than the serving threshold at step 419, the control unit 240 performs the procedure for recovering the serving transmission power at step 423 and then ends the transmission power control procedure. That is, the control unit 240 adjusts the serving transmission power of the target component carrier to a predetermined value. In order to accomplish this, the control unit 240 is capable of increasing the serving transmission power to a predetermined value. A description is made of the serving transmission power recovery procedure of the eNB 120 hereinafter in detail.

Figure 6:
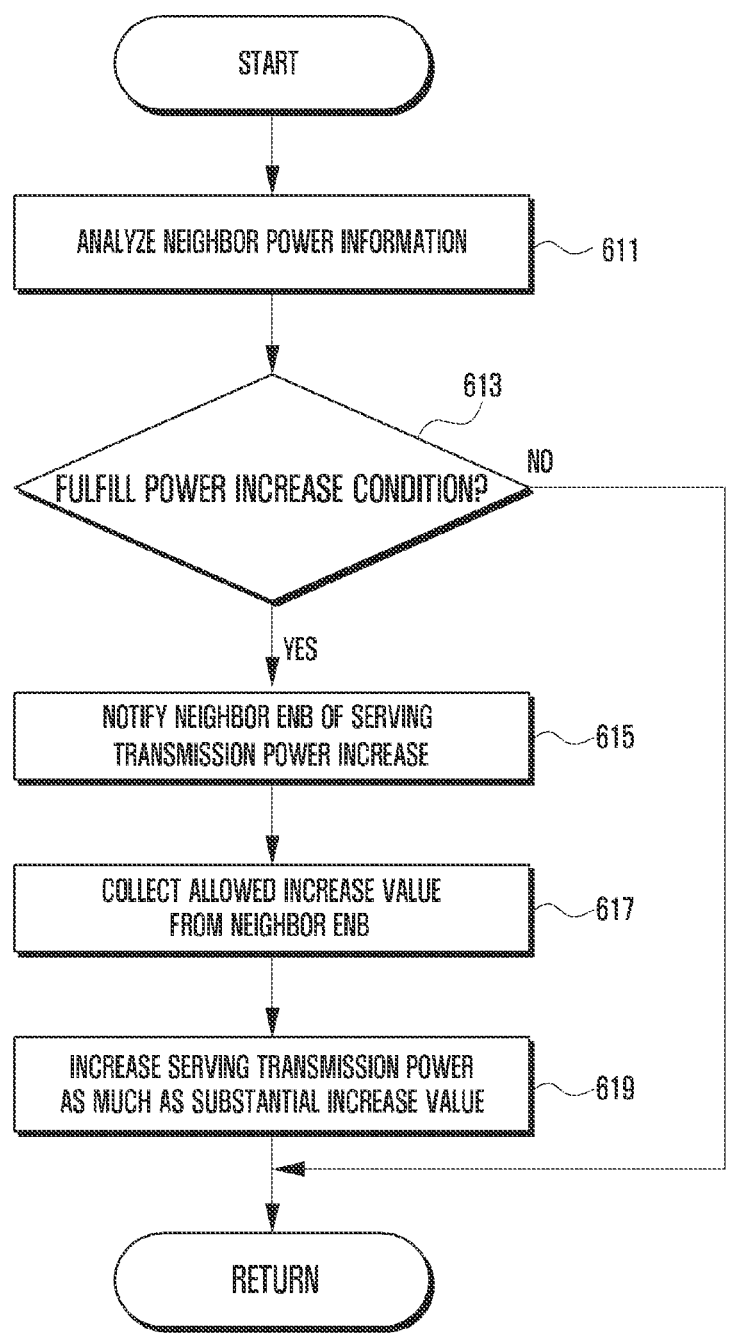
FIG. 6 is a flowchart illustrating the transmission power recovery procedure of FIG. 4.

FIG. 6 is a flowchart illustrating the transmission power recovery procedure of FIG. 4.

In the embodiment of FIG. 6, the transmission power recovery procedure of the eNB 120 starts in such a way that the control unit 240 analyzes the neighbor power information at step 611. At this time, the control unit 240 checks the neighbor eNB 123 in the neighbor power table and analyzes the neighbor power information of the neighbor eNB 123. Here, the control unit 240 calculates the average value of neighbor SNR per neighbor eNB 123. The control unit 240 is also capable of controlling to store the average value of the neighbor SNR per neighbor eNB 123. The control unit 240 also calculates the average value of previous SNR per neighbor eNB 123.

Next, the control unit 240 determines whether the neighbor power information fulfills the power increase condition at step 613. At this time, the control unit 240 determines whether the average value of the neighbor SNR has increased over as much as the amount exceeding the condition value preconfigured based on the average value of the previous SNR. That is, the control unit 240 determines whether the difference between the neighbor SNR average value and the previous SNR average value is greater than a preconfigured condition value. Here, it is determined that the neighbor SNR average value has increases over as much as the preconfigured condition value from the previous SNR average value, the control unit 240 determines that the neighbor power information fulfills the power increase condition. The control unit 240 also determines whether the neighbor SNR average value has increased continuously in a preconfigured period. Here, the control unit 240 is also capable of determining, when the neighbor SNR average value has increased continuously in a preconfigured period, that the neighbor power information fulfills the power increase condition. If it is determined that the neighbor power information does not fulfill the power increase condition, the control unit 240 returns the procedure to FIG. 4.

If it is determined that the neighbor power information fulfills the power increase condition at step 613, the control unit 240 notifies the neighbor eNB 123 of the increase of the serving transmission power at step 615. At this time, the control unit 240 checks the neighbor eNB 123 in the neighbor power terminal. The control unit 240 is also capable of transmitting the neighbor eNB 123 a power hold value of the neighbor transmission power to be maintained at the neighbor eNB 123. That is, the control unit 240 determines that the neighbor eNB 123 has to maintain the neighbor transmission power equal to or greater than the neighbor transmission power hold value, and sends the neighbor transmission power hold value to the neighbor eNB 123. For example, the control unit 240 is capable of calculating the power hold value as shown in equation (4). That is, the control unit 240 is capable of calculating the power hold value for the neighbor eNB 123 based on the neighbor SNR, neighbor threshold, and neighbor transmission power of the neighbor eNB 123 checked in the neighbor power table.

$$Required\_TX\_Power=(SNR\_Threshold)/(Current\_SNR)*Current\_TX\_Power \quad \text{Equation (4)}$$

Here, Required_TX_Power denotes the power reduction value for the candidate eNB, SNR_Threshold denotes the neighbor threshold of the neighbor eNB 123 as a candidate eNB, Current_SNR denotes the neighbor SNR of the neighbor eNB 123 as a candidate eNB, and Current_TX_Power denotes the neighbor transmission power of the neighbor eNB 123 as a candidate eNB.

Finally, the control unit 240 collects allowable increase value allowed at the neighbor eNB 123 for increase of the serving transmission power at step 617. The allowable increase value calculation procedure of the neighbor eNB 123 is described later with reference to FIG. 7. After increasing the serving transmission power as much as the allowable increase value at step 535, the control unit 240 returns the procedure to FIG. 4. At this time, the control unit 240 determines the substantial increase value based on the allowable increase value of the neighbor eNB 123. The control unit 240 increases the serving transmission power as much as the substantial increase value from the preconfigured value.

Figure 7:
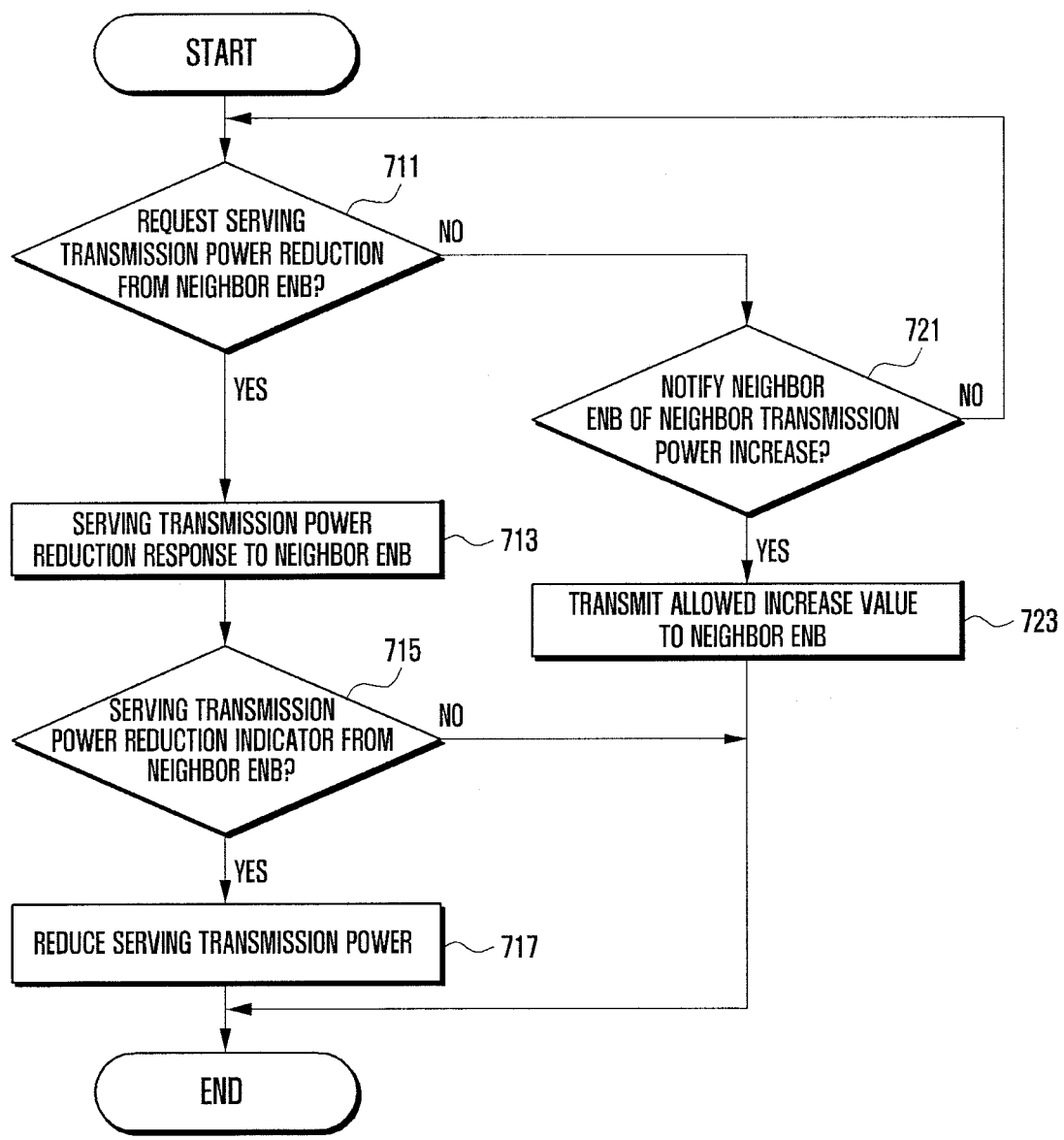
FIG. 7 is a flowchart illustrating the transmission power control procedure of the eNB according to an embodiment of the present invention.

FIG. 7 is a flowchart illustrating the transmission power control procedure of the eNB according to an embodiment of the present invention.

In the embodiment of FIG. 7, the transmission power control procedure of the eNB starts in such a way that when the neighbor eNB 123 requests for the serving transmission power reduction the control unit 240 detects this at step 711. At this time, the control unit 240 is capable of receiving the power reduction value to be applied to reducing the serving transmission power at the neighbor eNB 123. Next, the control unit 240 sends a response to the neighbor eNB 123 in response to the serving transmission power reduction request at step 713. At this time, the control unit 240 is capable of transmitting an expected SNR due to the reduction of the serving transmission power as indicated by the power reduction value.

For example, the control unit 240 is capable of calculating the pathloss, i.e. power loss, in the serving cell based on the serving transmission power difference used for calculating the serving transmission power and the serving SNR as shown in equation (5). The control unit 240 is also capable of calculating the expected signal power based on the difference between the power reduction value and the pathloss as shown in equation (6). The control unit 240 is also capable of calculating the expected SNR based on the expected signal power. That is, the control unit 240 is capable of calculating the expected SNR based on the interference power ratio used for calculating the serving SNR to the expected signal power.

$$\text{Pathloss} = \text{Current\_TX\_Power} - \text{Current\_RSRP} \qquad \text{Equation (5)}$$

Here, Pathloss denotes the pathloss, Current_TX_Power denotes the serving transmission power, and Current_RSRP denotes serving signal power.

$$\text{Expected\_RSRP} = \text{Reducible\_TX\_Power} - \text{Pathloss} \qquad \text{Equation (6)}$$

Here, Expected_RSRP denotes the expected signal power, Reducible_TX_Power denotes the power reduction value, and Pathloss denotes the pathloss.

Next, if the neighbor eNB 123 instructs to reduce the serving transmission power, the control unit 240 detects this at step 715, reduces the serving transmission power at step 717, and ends the serving power control procedure. At this time, the control unit 240 decreases the serving transmission power to the power reduction value from the preconfigured value. That is, the control unit 240 sets the power reduction value as the serving transmission power.

Otherwise, if the neighbor eNB 123 notifies of the increase of the neighbor transmission in the state that no serving transmission power reduction request is received at step 721, the control unit transmits the power increase value to the neighbor eNB 123 at step 723 and ends the serving transmission power control procedure. At this time, the control unit 240 is capable of receiving the power hold value from the neighbor eNB 123. The control unit 240 is also capable of calculating the power increase value based on the power hold value.

For example, the control unit 240 is capable of calculating the pathloss, i.e. power loss, in the serving cell based on the serving transmission power difference used for calculating the serving transmission power and the serving SNR as shown in equation (7). The control unit 240 is also capable of calculating the expected signal power based on the difference between the power hold value and the pathloss as shown in equation (8). The control unit 240 is also capable of calculating the expected SNR based on the expected signal power. That is, the control unit 240 is capable of calculating the expected SNR based on the interference power ratio used for calculating the serving SNR to the expected signal power.

$$\text{Pathloss} = \text{Current\_TX\_Power} - \text{Current\_RSRP} \qquad \text{Equation (7)}$$

Here, Pathloss denotes the pathloss, Current_TX_Power denotes the serving transmission power, and Current_RSRP denotes current signal power.

$$\text{Expected\_RSRP} = \text{Required\_TX\_Power} - \text{Pathloss} \qquad \text{Equation (8)}$$

Here, Expected_RSRP denotes the expected signal power, Required_TX_Power denotes the power hold value, and Pathloss denotes the pathloss.

The control unit is also capable of comparing the expected SNR with the serving threshold. At this time, the control unit 240 is capable of determining whether the expected SNR is greater than the serving threshold. If it is determined that the expected SNR is greater than the serving threshold, the control unit 240 is capable of calculating the power increase value in correspondence to the difference between the expected SNR and the serving threshold. That is, the control unit 240 is capable of determining that the neighbor transmission power can be increased as much as the power increase value. otherwise, if the expected SNR is less than the serving threshold, the control unit 240 skips calculating the power increase value and ends the serving transmission power control procedure.

According to the present invention, the eNB 120 of the wireless communication system is capable of controlling the serving transmission power or neighbor transmission power on a target component carrier. Through this, the present invention maintains the serving SNR to be equal to or greater than the serving threshold in the wireless communication system, thereby suppressing inter-cell interference between serving and neighbor cells and improving channel utilization efficiency. As a consequence, it is possible to improve the throughput of the wireless communication system.

The specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A transmission power control method of a base station in a wireless communication system, the method comprising:
    calculating signal-to-noise ratio of a target component carrier; and
    if the signal-to-noise ratio is less than a predetermined threshold, increasing a transmission power of the base station to a first predetermined level or requesting a neighbor base station to decrease a transmission power of the neighbor base station,
    wherein the neighbor base station is requested to decrease the transmission power of the neighbor base station if a neighbor signal-to-noise ratio calculated at the neighbor base station in correspondence to the component carrier is equal to or greater than a predetermined neighbor threshold.

2. The method of claim 1, wherein the neighbor base station is requested to reduce the neighbor transmission power if the neighbor signal-to-noise ratio is greater than the neighbor threshold.

3. The method of claim 1, wherein the increasing of the transmission power of the base station comprises:
    collecting power increase values allowed at the neighbor base station; and
    increasing the transmission power of the base station by adding a minimum value of power increase values.

4. The method of claim 3, wherein the increasing of the transmission power of the base station comprises requesting the neighbor base station for the power increase value.

5. The method of claim 1, further comprising:
    if the signal-to-noise ratio is equal to or greater than the predetermined threshold, increasing a transmission power to a second predetermined level which is allowed by the neighbor base station.

6. The method of claim 5, wherein the second predetermined level is determined based on a signal-to-noise ratio of the neighbor base station.

7. The method of claim 6, wherein the increasing of the transmission power of the base station comprises:
    collecting power increase values allowed at the neighbor base station; and
    increasing the transmission power by adding a minimum value of the power increase values.

8. The method of claim 7, wherein the increasing of the transmission power of the base station comprises requesting the neighbor base station for the power increase value.

9. A transmission power control apparatus of a base station in a wireless communication system, the apparatus comprising:
- a signal-to-noise ratio calculator configured to calculate a signal-to- noise ratio of a target component carrier; and
- a power regulator configured to increase a transmission power of the base station to a first predetermined level or to request a neighbor base station to decrease a transmission power of the neighbor base station, if the signal-to- noise ratio is less than a predetermined threshold,
- wherein the power regulator is configured to request a neighbor base station to decrease a transmission power of the neighbor base station if a neighbor signal-to-noise ratio calculated at the neighbor base station in correspondence to the component carrier is equal to or greater than a predetermined neighbor threshold.

10. The apparatus of claim 9, wherein the power regulator is configured to request the neighbor base station to reduce the neighbor transmission power if the neighbor signal-to-noise ratio is greater than the neighbor threshold.

11. The apparatus of claim 9, wherein the power regulator is configured to collect power increase values allowed at the neighbor base station and to increase the transmission power by adding a minimum value of power increase values.

12. The apparatus of claim 11, further comprising a communication unit configured to request the neighbor base station for the power increase value.

13. The apparatus of claim 9, wherein the power regulator is configured to increase a transmission power to a second predetermined level which is allowed by the neighbor base station, if the signal-to-noise ratio is equal to or greater than the predetermined threshold.

14. The apparatus of claim 13, wherein the second predetermined level is determined based on a signal-to-noise ratio of the neighbor base station.

15. The apparatus of claim 14, wherein the power regulator is configured to collect power increase values allowed at the neighbor base station and to increase the transmission power by adding a minimum value of the power increase values.

16. The apparatus of claim 15, further comprising a communication unit configured to request the neighbor base station for the power increase value.

* * * * *